US012456241B2

(12) United States Patent
He et al.

(10) Patent No.: US 12,456,241 B2
(45) Date of Patent: Oct. 28, 2025

(54) IMAGE PROCESSING METHOD AND APPARATUS, COMPUTER DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Keke He, Shenzhen (CN); Junwei Zhu, Shenzhen (CN); Xinyi Zhang, Shenzhen (CN); Ying Tai, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 409 days.

(21) Appl. No.: 17/984,110

(22) Filed: Nov. 9, 2022

(65) Prior Publication Data

US 2023/0316607 A1    Oct. 5, 2023

Related U.S. Application Data

(63) Continuation of application No. PCT/CN2022/111774, filed on Aug. 11, 2022.

(30) Foreign Application Priority Data

Mar. 30, 2022    (CN) .......................... 202210334052.7

(51) Int. Cl.
*G06T 11/60* (2006.01)
*G06V 40/16* (2022.01)

(52) U.S. Cl.
CPC ............ *G06T 11/60* (2013.01); *G06V 40/161* (2022.01); *G06V 40/168* (2022.01)

(58) Field of Classification Search
None
See application file for complete search history.

(56) References Cited

U.S. PATENT DOCUMENTS 11,276,231 B2 *    3/2022    Chandran ............ G06V 10/754
11,581,020 B1 *    2/2023    Hadap .................. G11B 27/036
(Continued)

FOREIGN PATENT DOCUMENTS

CN    110264396 A    9/2019
CN    111080511 A    4/2020
(Continued)

OTHER PUBLICATIONS

Chen et al. "SimSwap: An Efficient Framework for High Fidelity Face Swapping", arXiv:2106.06340v1 [cs.CV] Jun. 11, 2021 (Year: 2021).*

(Continued)

*Primary Examiner* — Randolph I Chu
(74) *Attorney, Agent, or Firm* — Morgan, Lewis & Bockius LLP

(57) ABSTRACT

This application provides an image processing method performed by a computer device. The image processing method includes: receiving a face swapping request; acquiring an attribute parameter of the image, an attribute parameter of the target face, and a face feature of the target face, the attribute parameter of the image indicating a three-dimensional attribute of the face in the image; determining a target attribute parameter based on the attribute parameter of the image and the attribute parameter of the target face; determining a target comprehensive feature based on the target attribute parameter and the face feature of the target face; encoding the image to obtain an image encoding feature of the image; migrating the target comprehensive feature to the image encoding feature of the image by normalization to obtain a fusion encoding feature; and decoding the fusion (Continued)

encoding feature to obtain a target face-swapped image including a fusion face.

12 Claims, 6 Drawing Sheets

(56) References Cited

U.S. PATENT DOCUMENTS

| | | | | |
|---|---|---|---|---|
| 11,657,852 | B1* | 5/2023 | Zavesky | H04N 21/23418 |
| | | | | 386/278 |
| 11,769,346 | B2* | 9/2023 | Moustafa | G06V 10/82 |
| | | | | 382/158 |
| 2020/0151424 | A1 | 5/2020 | Li et al. | |
| 2021/0142440 | A1* | 5/2021 | Ahn | G06V 40/171 |
| 2023/0021661 | A1* | 1/2023 | Bao | G06V 40/16 |
| 2023/0027783 | A1* | 1/2023 | Kuta | G06F 21/6254 |
| 2023/0063681 | A1* | 3/2023 | Palacios | G06F 18/214 |
| 2023/0081982 | A1* | 3/2023 | He | G06V 10/751 |
| | | | | 382/157 |
| 2023/0100427 | A1* | 3/2023 | He | G06V 40/168 |
| | | | | 382/118 |
| 2023/0112462 | A1* | 4/2023 | Li | G11B 27/28 |
| | | | | 386/278 |
| 2023/0162407 | A1* | 5/2023 | Kalarot | G06V 40/172 |
| | | | | 382/118 |
| 2023/0316587 | A1* | 10/2023 | Ghebremusse | G06V 10/454 |
| | | | | 345/619 |

FOREIGN PATENT DOCUMENTS

| | | |
|---|---|---|
| CN | 111508050 A | 8/2020 |
| CN | 111783603 A | 10/2020 |
| CN | 112581635 A | 3/2021 |
| CN | 113240575 A | 8/2021 |
| CN | 113642491 A | 11/2021 |
| CN | 113762022 A | 12/2021 |
| CN | 114140320 A | 3/2022 |
| WO | WO 2021258920 A1 | 12/2021 |

OTHER PUBLICATIONS

Li et al. "FaceShifter: Towards High Fidelity and Occlusion Aware Face Swapping", arXiv:1912.13457v3 [cs.CV] Sep. 15, 2020 (Year: 2020).*

Naruniec et al. "High-Resolution Neural Face Swapping for Visual Effects", Eurographics Symposium on Rendering vol. 39 (2020), No. 4 2020 (Year: 2020).*

Petrov et al. "DeepFaceLab: Integrated, flexible and extensible face-swapping framework", arXiv:2005.05535v5 [cs.CV] Jun. 29, 2021 (Year: 2021).*

Nirkin et al. "On Face Segmentation, Face Swapping, and Face Perception", arXiv:1704.06729v1 [cs.CV] Apr. 22, 2017 (Year: 2017).*

Nirkin et al. "FSGAN: Subject Agnostic Face Swapping and Reenactment", arXiv:1908.05932v1 [cs.CV] Aug. 16, 2019 (Year: 2019).*

Tencent Technology, ISR, PCT/CN2022/111774, Dec. 12, 2022, 2 pgs.

Lingzhi Li et al., "FaceShifter: Towards High Fidelity and Occlusion Aware Face Swapping", arxiv.org, Sep. 15, 2020, 11 pgs.

Tencent Technology, Korean Office Action, KR Patent Application No. 10-2022-7040870, Dec. 18, 2023, 11 pgs.

Tencent Technology, Written Opinion, PCT/CN2022/111774, Dec. 22, 2022, 3 pgs.

Tarun Yenamandra et al., "i3DMM: Deep Implicit 3D Morphable Model of Human Heads", Proceedings of the IEEE/CVF Conference on Computer Vision and Pattern Recognition (CVPR), 2021, 11 pgs.

Tencent Technology, Extended European Search Report, EP Patent Application No. 22934637.4, Feb. 13, 2025, 7 pgs.

Anni Tang et al., "Dense 3D Coordinate Code Prior Guidance for High-Fidelity Face Swapping and Face Reenactment", 16th IEEE International Conference on Automatic Face and Gesture Recognition (FG 2021), Dec. 2021, 8 pgs.

Jia Li et al., "Faceinpainter: High Fidelity Face Adaptation to Heterogeneous Domains", Proceedings of the IEEE/CVF Conference on Computer Vision and Pattern Recognition (CVPR), 2021, 10 pgs.

* cited by examiner

IMAGE PROCESSING METHOD AND APPARATUS, COMPUTER DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/111774, entitled "IMAGE PROCESSING METHODS, APPARATUS, COMPUTER EQUIPMENT, COMPUTER-READABLE STORAGE MEDIA AND COMPUTER PROGRAM PRODUCTS" filed on Aug. 11, 2022, which claims priority to Chinese Patent Application No. 202210334052.7, filed with the State Intellectual Property Office of the People's Republic of China on Mar. 30, 2022, and entitled "IMAGE PROCESSING METHODS, APPARATUS, COMPUTER EQUIPMENT, COMPUTER-READABLE STORAGE MEDIA AND COMPUTER PROGRAM PRODUCTS", all of which are incorporated herein by reference in their entirety.

FIELD OF THE TECHNOLOGY

This application relates to the field of technologies such as artificial intelligence (AI) and computer vision (CV), and in particular, to an image processing method and apparatus, a computer device, a computer-readable storage medium, and a computer program product.

BACKGROUND OF THE DISCLOSURE

Face swapping is an important technology in the field of computer vision. Face swapping is widely used in scenarios such as content production, film and television portrait production, and entertainment video production. For a given image A and a given image B, face swapping refers to a process of migrating face features in the image A to the image B to obtain a face-swapped image.

In the related art, face swapping is generally realized based on shape fitting. For example, based on detected face key points in the image A and face key points in the image B, a shape change relationship between the two images in terms of regions such as five sense organs and contours of faces may be calculated, and the faces in the image A and the image B are fused according to the shape change relationship to obtain the face-swapped image.

Face swapping is realized by face deformation and fusion in the above shape fitting process. However, when poses of the faces in the image A and the image B vary greatly, faces varying greatly in pose cannot be processed by simple shape fitting, easily leading to unnatural face deformation in the face-swapped image. In other words, the face-swapped image is less similar to the face in the image A, leading to low accuracy of face swapping.

SUMMARY

Embodiments of this application provide an image processing method and apparatus, a computer device, a computer-readable storage medium, and a computer program product, which can improve a similarity before and after face swapping, so as to improve accuracy of face swapping.

An embodiment of this application provides an image processing method, including:

receiving a face swapping request, the face swapping request being used for requesting replacement of a face in an image with a target face;

acquiring an attribute parameter of the image, an attribute parameter of the target face, and a face feature of the target face, the attribute parameter of the image indicating a three-dimensional attribute of the face in the image;

determining a target attribute parameter based on the attribute parameter of the image and the attribute parameter of the target face;

determining a target comprehensive feature based on the target attribute parameter and the face feature of the target face; and fusing the face in the image and the target face into a fusion face according to the target comprehensive feature to obtain a target face-swapped image comprising the fusion face.

An embodiment of this application provides an image processing apparatus, including:

an attribute parameter acquisition module configured to receive a face swapping request, the face swapping request being used for requesting replacement of a face in an image with a target face;

a target attribute parameter determination module configured to acquire an attribute parameter of the image, an attribute parameter of the target face, and a face feature of the target face, the attribute parameter of the image indicating a three-dimensional attribute of the face in the image; and determine a target attribute parameter based on the attribute parameter of the image and the attribute parameter of the target face;

a comprehensive feature determination module configured to determine a target comprehensive feature based on the target attribute parameter and the face feature of the target face; and a fusion module configured to fuse the face in the image and the target face into a fusion face according to the target comprehensive feature to obtain a target face-swapped image comprising the fusion face.

An embodiment of this application provides a computer device, including a memory, a processor, and a computer program stored on the memory, the computer program, when executed by the processor, causing the computer device to implement the foregoing image processing method.

An embodiment of this application provides a non-transitory computer-readable storage medium, storing a computer program, the computer program, when executed by a processor of a computer device, causing the computer device to implement the foregoing image processing method.

An embodiment of this application provides a computer program product, including a computer program, the computer program, when executed by a processor, implementing the foregoing image processing method.

The technical solutions provided in the embodiments of this application have the following beneficial effects:

According to the embodiments of this application, the target attribute parameter is determined based on the attribute parameter of the image and the attribute parameter of the target face, so as to position a three-dimensional attribute feature of a face in an image expected to be generated. The target comprehensive feature that can comprehensively represent the image and the target face is obtained based on the target attribute parameter and the face feature of the target face. The image is encoded to obtain the image encoding feature of the image, so as to obtain a pixel-level refined feature of the image through the image encoding feature.

The target comprehensive feature is migrated to the image encoding feature of the image by normalization to obtain the fusion encoding feature. In the embodiments of this application, an encoding feature refined to a pixel level is mixed with a global comprehensive feature, and the image encoding feature is aligned with the target comprehensive feature, so as to improve accuracy of the generated fusion encoding feature. The fusion encoding feature is decoded to obtain the target face-swapped image including the fusion face, and a decoded image can be refined to each pixel to show the target comprehensive feature, so that sense organs of a fusion face in the decoded image are closer to the target face, which improves a similarity between the fusion face and the target face in terms of sense organs, thereby improving accuracy of face swapping.

BRIEF DESCRIPTION OF THE DRAWINGS

To describe the technical solutions in embodiments of this application more clearly, the following briefly describes the accompanying drawings required for describing the embodiments of this application.

DESCRIPTION OF EMBODIMENTS

Figure 1:
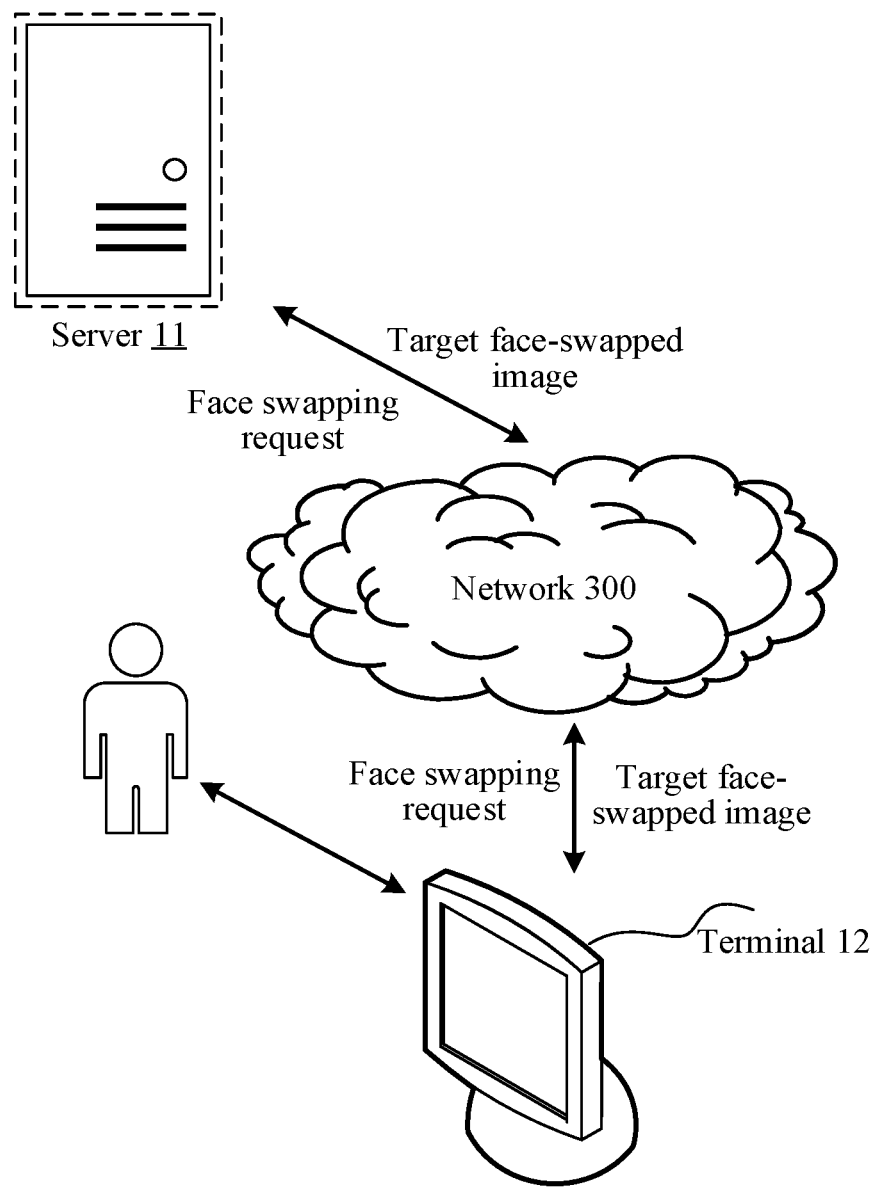
FIG. 1 is a schematic diagram of an implementation environment of an image processing method according to an embodiment of this application.

The following describes the embodiments of this application with reference to the accompanying drawings in this application. It is to be understood that implementations set forth below with reference to the accompanying drawings are exemplary descriptions of the technical solutions used for explaining embodiments of this application and do not constitute limitations on the technical solutions of the embodiments of this application.

It may be understood that, face images as referred to in DESCRIPTION OF EMBODIMENTS of this application, for example, any object-related data such as a first sample image, a second sample image, a pose image, and a video of a target object used in training of a face swapping model, and any object-related data such as an image and a face feature and an attribute parameter of a target face used in face swapping performed by the face swapping model, are all acquired with consent or permission of related objects. When the following embodiments of this application are applied to specific products or technologies, permission or consent needs to be obtained from objects, and collection, use, and processing of relevant data need to comply with relevant laws, regulations, and standards of relevant countries and regions. In addition, face swapping processes performed on a face image of any object by using an image processing method of this application are all face swapping processes performed based on a face swapping service or face swapping request triggered by the related object and with permission or consent of the related object.

The technical terms involved in this application are introduced below:

1) Face swapping: Face swapping means using a target face in one face image to swap a face in another image.

2) Face swapping model: The face swapping model may be invoked to swap a target face to any image based on an attribute parameter and a face feature of the target face. The image processing method according to the embodiments of this application may involve replacing a face in the image with an exclusive target face by using the face swapping model.

3) To-be-swapped image: The image is an image in which a face needs to be swapped. For example, the target face may be swapped for the face in the image. It should be noted that the image is swapped to obtain a target face-swapped image by using the image processing method according to the embodiments of this application. A fusion face included in the target face-swapped image is fusion of the face in the image and the target face. The fusion face is more similar to the target face in terms of sense organs. Poses such as an expression and an angle of the face in the image are further fused in the fusion face, so that the target face image is more vivid and realistic.

3) Attribute parameter: An attribute parameter of an image is used for indicating three-dimensional attributes of a face in the image, which may represent attributes of the face in a three-dimensional space, such as poses and a space environment.

4) Face feature: The face feature represents a feature of the face in the image in a two-dimensional plane, for example, a distance between two eyes and a size of a nose. The face feature may represent identity of an object with the face feature.

5) Target face: The target face is an exclusive face used for replacing the face in the image. The target face may be a face specified based on a user's selection operation. An embodiment of this application provides a face swapping service that takes the target face as the exclusive face. That is, the exclusive target face may be swapped to any image. For example, a target face A may replace a face of an image B, and the target face A may also replace a face of an image C.

6) First sample image: The first sample image includes the target face, which is an image used in training of the face swapping model.

7) Second sample image: The second sample image includes a to-be-replaced face, which is an image used in training of the face swapping model. During the training, the target face in the first sample image may be taken as an exclusive face, and the target face in the first sample image is swapped to the second sample image, so as to obtain the face swapping model by training based on this process.

FIG. 1 is a schematic diagram of an implementation environment of an image processing method according to an embodiment of this application. As shown in FIG. 1, the implementation environment includes: a server 11 and a terminal 12.

The server 11 is provided with a face swapping model obtained by training. The server 11 may provide the terminal 12 with a face swapping function based on the face swapping model. The face swapping function means swapping a face in an image based on a target face, so that a fusion face in a generated target face image can fuse an original face in the image and the target face. In some embodiments, the terminal 12 may transmit a face swapping request to the server 11. The face swapping request may carry the image. The server 11 may perform, based on the face swapping request, the image processing method of this application to generate a target face-swapped image, and returns the target face-swapped image to the terminal 12. In some embodiments, the server 11 may be a backend server of an application program. An application program is installed on the terminal 12. The terminal 12 and the server 11 may exchange data based on the application program to realize a face swapping process. The application program may be provided with a face swapping function. The application program is any application supporting the face swapping function. For example, the application program includes, but is not limited to, a video editing application, an image processing tool, a video application, a live streaming application, a social application, a content interaction platform, a game application, and so on.

The server may be an independent physical server, or may be a server cluster or a distributed system formed by a plurality of physical servers, or may be a cloud server or a server cluster that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The network may include but not limited to: a wired network, and a wireless network. The wired network includes: a local area network, a metropolitan area network, and a wide area network. The wireless network includes: Bluetooth, Wi-Fi, and another network implementing wireless communication. The terminal may be smart phones (such as an Android phones or iOS phones), tablet computers, laptop computers, digital broadcast receivers, mobile Internet devices (MIDs), personal digital assistants, desktop computers, vehicle-mounted terminals (such as vehicle-mounted navigation terminals or vehicle-mounted computers), smart home appliances, aircrafts, smart speakers, smart watches, or the like. The terminal and the server may be directly or indirectly connected by wired or wireless communication, but are not limited thereto.

The image processing method according to this embodiment of this application relates to the following technologies such as AI and CV. For example, processes of extracting an attribute parameter in a first sample image and training the face swapping model are realized by using cloud computing and big data processing technologies in the AI technology. For example, face recognition is performed on image frames in a video by using the CV technology, so as to crop out a first sample image including a target face.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

The AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes several major fields such as a computer vision (CV) technology, a speech processing technology, a natural language processing technology, machine learning (ML)/deep learning (DL), autonomous driving, and smart transportation.

It is to be understood that the CV technology is a science that studies how to use a machine to "see", and furthermore, that uses a camera and a computer to replace human eyes to perform machine vision such as recognition and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technology generally includes technologies such as image processing, image recognition, image semantic understanding, image retrieval, optical character recognition, video processing, video semantic understanding, video content/behavior recognition, 3D object reconstruction, 3D technology, virtual reality, augmented reality, synchronous positioning and map construction, autonomous driving, and smart transportation, and further includes biometric feature recognition technologies such as common face recognition and fingerprint recognition.

To make the solved technical problem objectives, the implemented technical solutions, and the achieved technical effects of the embodiments of this application clearer, the following further describes in detail implementations of this application with reference to the accompanying drawings.

Figure 2:
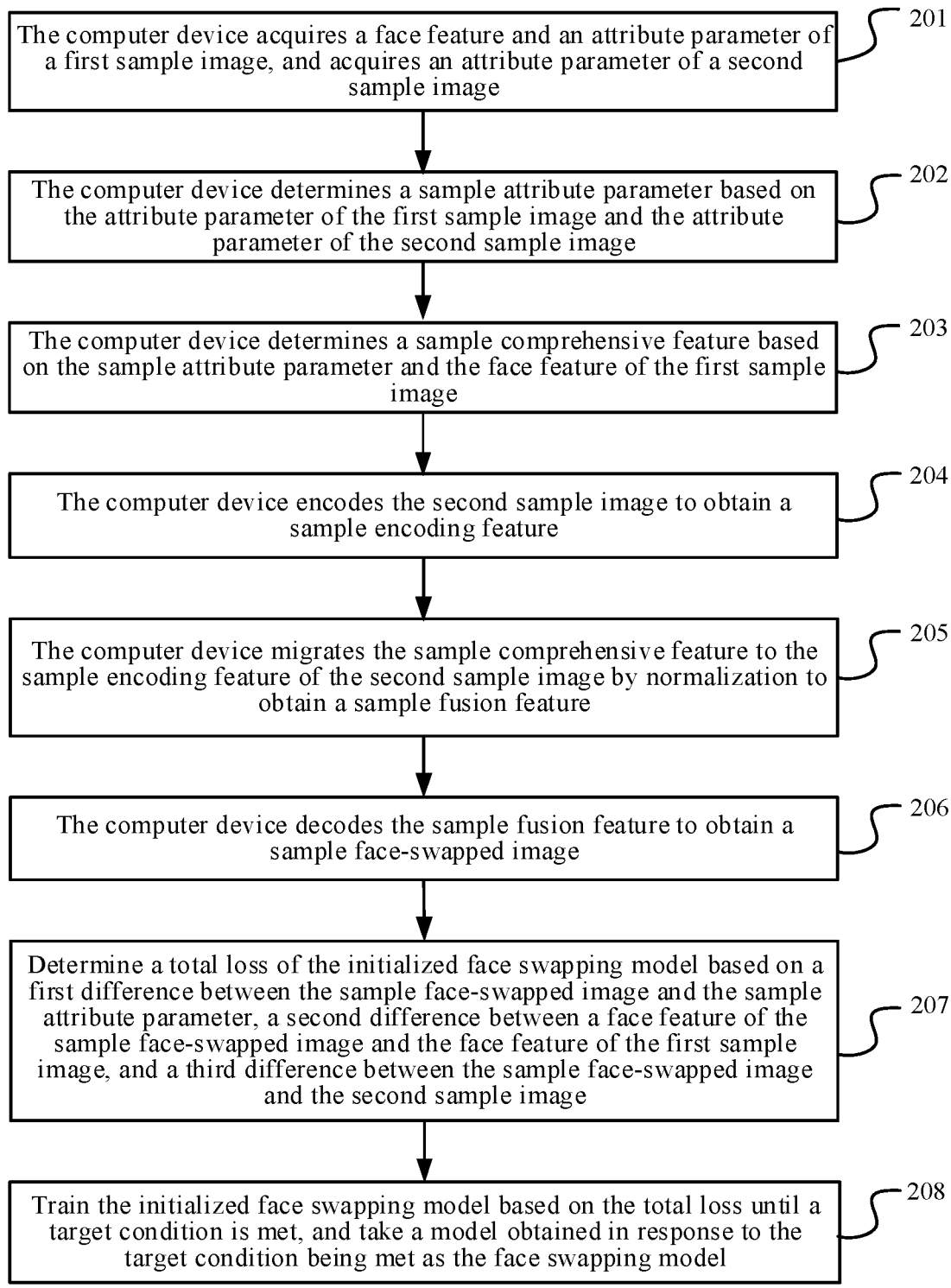
FIG. 2 is a schematic flowchart of a training method for a face swapping model training method according to an embodiment of this application.

FIG. 2 is a schematic flowchart of a training method for a face swapping model according to an embodiment of this application. The method may be performed by a computer device (e.g., the server 11 shown in FIG. 1). As shown in FIG. 2, the method includes the following step 201 to step 208.

Step 201: The computer device acquires a face feature and an attribute parameter of a first sample image, and acquires an attribute parameter of a second sample image.

The first sample image includes a target face. The second sample image includes a to-be-replaced face. The computer device may collect data including any face as the second sample image, and collect images including the target face at a plurality of pose angles as the first sample image. The computer device may acquire the attribute parameter of the first sample image and the attribute parameter of the second sample image through a face parameter estimation model. The computer device may acquire a face feature of the first sample image through a face recognition model.

The face parameter estimation model is configured to estimate a three-dimensional attribute parameter of the face based on an inputted two-dimensional face image. The face parameter estimation model may be a model of a convolutional neural network structure. For example, the face parameter estimation model may be 3D morphable models (3DMM). In this embodiment of this application, a three-dimensional attribute parameter of the inputted two-dimensional face image may be partially regressed through a residual network (ResNet) in the 3DMM. The face parameter estimation model may also be any other model with a function of extracting a three-dimensional attribute parameter of a face in a two-dimensional image. Only the 3DMM is taken as an example herein.

The attribute parameter is used for indicating three-dimensional attributes of a face in an image, which may represent attributes of the face in a three-dimensional space, such as poses and a space environment. The attribute parameter includes, but is not limited to, a shape coefficient (id_coeff), an expression coefficient (expression_coeff), a texture coefficient (texture_coeff), an angle coefficient (angles_coeff), an illumination coefficient (gamma_coeff), and the like. The shape coefficient represents a shape of a face, a shape of five sense organs of the face, and the like. The angle coefficient represents angles of the face such as a pitch angle and a left-right deflection angle. The texture coefficient may represent skin, hair, and so on of the face. The illumination coefficient may represent illumination of a surrounding environment in which the face in the image is located.

The computer device according to this embodiment of this application may extract one or more specified items in the shape coefficient, the expression coefficient, the texture coefficient, the angle coefficient, and the illumination coefficient as attribute parameters of various sample images, or extract all the items as attribute parameters of the corresponding sample images. Correspondingly, the attribute parameters of the first sample image and the second sample image may be acquired in the following three manners.

In manner 1, the computer device extracts the shape coefficient of the target face in the first sample image as the attribute parameter of the first sample image, and the computer device extracts the expression coefficient and the angle coefficient in the second sample image as the attribute parameter of the second sample image.

In the manner 1, the attribute parameter of the first sample image includes the shape coefficient of the target face in the first sample image. The attribute parameter of the second sample image includes the expression coefficient and the angle coefficient of the face in the second sample image. The shape coefficient of the first sample image and the expression coefficient and the angle coefficient of the second sample image are acquired to facilitate subsequent fusion of a shape feature of the target face and features of a to-be-replaced face such as an expression and an angle, so that a face in a sample face-swapped image obtained by fusion can have shapes of five sense organs of the target face and the expression, the angle, and the like of the to-be-replaced face. Therefore, a similarity between the fused face and the target face in terms of the shapes of the five sense organs is improved.

In manner 2, for the second sample image, the computer device may acquire a pre-configuration parameter of the second sample image as the attribute parameter of the second sample image. For the first sample image, the computer device extracts the shape coefficient of the target face in the first sample image as the attribute parameter of the first sample image.

In the manner 2, the computer device configures, as required, which items may be included in the attribute parameter of the second sample image. The attribute parameter of the second sample image may include a pre-configuration parameter. For example, the pre-configuration parameter may include at least one of an expression coefficient, a texture coefficient, an angle coefficient, and an illumination coefficient. The pre-configuration parameter is a parameter pre-configured as required. For example, through the pre-configuration parameter including the illumination coefficient and the expression coefficient, the face finally obtained by fusion has features such as illumination of a surrounding environment and an expression of the to-be-replaced face. Alternatively, the pre-configuration parameter may include the texture coefficient, the angle coefficient, and the like. Details are not described herein again.

In manner 3, the computer device may also extract a plurality of parameters of the first sample image and the second sample image as the corresponding attribute parameters. Required parameters may be further extracted from the plurality of parameters in subsequent steps.

As an example, the attribute parameter of the first sample image may include the shape coefficient, the expression coefficient, the texture coefficient, the angle coefficient, and the illumination coefficient of the target face in the first sample image. For example, the attribute parameter may be represented as a vector. When the attribute parameter of the first sample image includes the above five parameters, the attribute parameter of the first sample image may be represented as a 257-dimensional feature vector. The attribute parameter of the second sample image may also include the shape coefficient, the expression coefficient, the texture coefficient, the angle coefficient, and the illumination coefficient of the second sample image. Correspondingly, the attribute parameter of the second sample image may also be represented as a 257-dimensional feature vector.

In some embodiments, the computer device may acquire pose images of the target face at a plurality of pose angles, and extract the face feature and the attribute parameter of the first sample image based on the pose images. A process in which the computer device acquires the face feature and the attribute parameter of the first sample image may be realized through the following technical solution: The computer device acquires at least two pose images as the first sample image. The at least two pose images include at least two face poses of the target face. The computer device acquires face features and attribute parameters corresponding to the at least two face poses based on the at least two pose images. The computer device takes a mean of the face features corresponding to the at least two face poses as the face feature of the first sample image, and takes a mean of the attribute parameters corresponding to the at least two face poses as the attribute parameter of the first sample image. The computer device may invoke the face parameter estimation model to extract the attribute parameter of each of the at least two pose images, calculate the mean of the attribute parameters of the at least two pose images, and take the mean of the attribute parameters of the at least two pose images as the attribute parameter of the first sample image. The computer device may invoke the face recognition model to extract the face feature of each of the at least two pose images in the two-dimensional plane, calculate the mean of the face features of the at least two pose images, and take the mean of the face features of the at least two pose images as the face feature of the first sample image. For example, the face feature of the first sample image may be a 512-dimensional feature vector. The face feature represents identity of a target object. The target face is a face of the target object.

In some embodiments, the computer device may extract a plurality of pose images including the target face from a video. The computer device may acquire at least two pose images as the first sample image through the following technical solution: The computer device performs face recognition on at least two image frames included in a video of a target object to obtain at least two image frames including the target face. The target face is a face of the target object. The computer device performs face cropping on the at least two image frames to obtain the at least two pose images, and takes the at least two pose images as the first sample image. The face poses may include, but is not limited to, any attribute such as face expressions and angles, shapes of five sense organs of the face, movement, glasses worn on the face, and face makeup. The computer device may distinguish the poses through any attribute in the face poses. For example, a smiling face and an angry face may be taken as faces of two poses. A bespectacled face and a non-bespectacled face may also be taken as faces of two poses. A face at a pitch angle of 45° upward with eyes closed and a face at a pitch angle of 30° downward with eyes open of the target face may also be taken as faces of two poses. The computer device may also acquire a plurality of independent still images of the target face and extract a plurality of pose images from the plurality of independent still images. The computer device may also perform face cropping on the plurality of still images to obtain at least two pose images, and take the at least two pose images as the first sample image.

In some embodiments, the computer device may perform face cropping on the image frames to obtain the pose images through the following technical solution. Firstly, the computer device performs face detection on the image frames to obtain face coordinate boxes of the image frames. Specifically, a face region in which the target face in the image frames is located is circled by the face coordinate boxes. Next, the computer device performs face registration on the image frames according to the face coordinate boxes of the image frames to obtain target face key points in the image frames. Specifically, the target face key points may include five sense organs key points, face contour key points of the target face in the image frames, and may also include hair key points or the like. The computer device may be implemented through a target detection network, such as a YOLO network, and perform key point detection on the image frames. Input information of the target detection network is a face image and face coordinate boxes of the face image in the image frames, and output information is a face key point coordinate sequence including the target face key points. A quantity of key points included in the face key point coordinate sequence may be pre-configured based on different requirements on face details. For example, the quantity of key points included in the face key point coordinate sequence may be a fixed value such as 5, 68, or 90. Finally, the computer device performs face cropping on the image frames based on the target face key points to obtain the pose images, connect the target face key points according to an order represented by the face key point coordinate sequence, and take closed graphs obtained by the connection as the pose images.

In some embodiments, a process of acquiring the second sample image is similar to the process of acquiring the first sample image. For example, the computer device may acquire an object image including any object, perform face cropping on the object image to obtain an image including a face of the object, and take the image including the face of the object as the second sample image. Face cropping is performed in a manner similar to the technical solution of performing face cropping on the image frames to obtain the pose images. Details are not described herein again. In addition, the computer device may invoke the face parameter estimation model to extract the attribute parameter of the second sample image.

In some embodiments, the computer device may store the face feature and the attribute parameter of the first sample image. Specifically, the computer device may store the face feature and the attribute parameter of the first sample image to a target address. The target address is a pre-configured storage address. Fixed storage of the face feature and the attribute parameter of the target face enables convenient direct extraction of data from the target address in subsequent use. For example, when an exclusive face swapping service is externally provided by using a trained face swapping model, by fixed storage, the computer device can directly extract the face feature and the attribute parameter of the target face that have been stored, so as to realize an exclusive face swapping process of swapping the exclusive target face to any face image. In another example, the face feature and the attribute parameter of the target face may be directly extracted from the target address for training in an iterative training phase.

Step 202: The computer device determines a sample attribute parameter based on the attribute parameter of the first sample image and the attribute parameter of the second sample image.

The sample attribute parameter is used for indicating an expected attribute of a face in a to-be-generated sample face-swapped image.

Corresponding to the manner 1 in step 201, the computer device may determine the shape coefficient of the first sample image and the expression coefficient and the angle coefficient of the second sample image to be the sample attribute parameter.

Corresponding to the manner 2 and the manner 3 in step 201, the computer device may select, as required, various attribute parameters of the first sample image and the second sample image as the sample attribute parameter. Step 202 may be implemented through the following technical solution: The computer device determines the shape coefficient of the first sample image and the pre-configuration parameter of the second sample image to be the target attribute parameter. The pre-configuration parameter of the second sample image includes at least one of an expression coefficient, an angle coefficient, a texture coefficient, and an illumination coefficient. Corresponding to the manner 2 in step 201, the pre-configuration parameter may be the pre-configuration parameter acquired in the manner 2 in step 201. In this step, the computer device may directly acquire the pre-configuration parameter of the second sample image. Corresponding to the manner 3 in step 201, the pre-configuration parameter may also be a pre-configuration parameter extracted from the attribute parameter including the five coefficients. In this step, the computer device may extract a pre-configuration parameter corresponding to a pre-configuration parameter ID from the second sample image according to the pre-configuration parameter ID. For example, the pre-configuration parameter ID may include parameter IDs of at least one of the expression coefficient, the angle coefficient, the texture coefficient, and the illumination coefficient. For example, the pre-configuration parameter may include the expression coefficient and the angle. That is, the face in the to-be-generated sample face-swapped image is expected to have the shapes of the face and the five sense organs of the target face, as well as the expression and the angle of the face in the second sample image. The computer device may determine the shape coefficient of the target face and the expression coefficient and the angle of the second sample image to be the target attribute parameter. In another example, the pre-configuration parameter may also include the texture coefficient and the illumination coefficient. That is, the face in the sample face-swapped image is expected to have the shape of the target face, as well as the texture coefficient and the illumination coefficient of the face in the second sample image. The computer device may also determine the shape coefficient of the target face and the texture coefficient and the illumination coefficient of the second sample image to be the sample attribute parameter.

Step 203: The computer device determines a sample comprehensive feature based on the sample attribute parameter and the face feature of the first sample image.

The computer device may splice the sample attribute parameter and the face feature of the first sample image, and take a splicing feature obtained by splicing as the sample comprehensive feature. The sample comprehensive feature may represent a comprehensive feature of a face in a sample face feature expected to be generated. For example, the sample attribute parameter and the face feature may be expressed as feature vectors. The computer device may splice a first feature vector corresponding to the sample attribute parameter and a second feature vector corresponding to the face feature to obtain a third feature vector corresponding to the sample comprehensive feature.

Step 204: The computer device encodes the second sample image to obtain a sample encoding feature.

The computer device inputs the second sample image into an encoder of an initialized face swapping model, encodes the second sample image through the encoder to obtain an encoding vector corresponding to the second sample image, and takes the encoding vector as the sample encoding feature. The second sample image is encoded to obtain the sample encoding feature, so as to accurately refine pixel-level information of various pixels included in the second sample image.

The encoder includes a plurality of cascaded convolutional layers. The second sample image is convoluted through the plurality of cascaded convolutional layers. Each convolutional layer inputs a convolution result to next convolutional layer to continue the convolution. The final convolutional layer outputs the sample encoding feature.

Step 205: The computer device migrates the sample comprehensive feature to the sample encoding feature of the second sample image by normalization to obtain a sample fusion feature.

The computer device may use step 205 to realize fusion of the sample comprehensive feature and the sample encoding feature. The computer device may align the sample encoding feature from third feature distribution of the sample comprehensive feature to fourth feature distribution of the second sample image by normalization to obtain the sample fusion feature. In some embodiments, the feature distribution may include a mean and a standard deviation. Correspondingly, step 205 may be implemented through the following technical solution: The computer device acquires a third mean and a third standard deviation of the sample encoding feature in at least one feature channel to take normal distribution conforming to the third mean and the third standard deviation as the third feature distribution, and acquires a fourth mean and a fourth standard deviation of the sample comprehensive feature in the at least one feature channel to take normal distribution conforming to the fourth mean and the fourth standard deviation as the fourth feature distribution. The computer device aligns the mean and the standard deviation (the third feature distribution) of the sample encoding feature in each feature channel with the mean and the standard deviation (the fourth feature distribution) of the sample comprehensive feature in the corresponding feature channel to obtain the sample fusion feature. The computer device may normalize each feature channel of the sample encoding feature, and align a mean and a standard deviation of the normalized sample encoding feature with a mean and a standard deviation of the sample comprehensive feature to generate the sample fusion feature.

As an example, the computer device may realize the above alignment from the third feature distribution to the fourth feature distribution based on the sample encoding feature and the sample comprehensive feature through the following formula (1), and calculate the sample fusion feature.

$$AdaIN(x, y) = \sigma(y)\left(\frac{x - \mu(x)}{\sigma(x)}\right) + \mu(y); \quad (1)$$

where x denotes the sample encoding feature, y denotes the sample comprehensive feature, $\sigma(X)$ and $\mu(x)$ respectively denote the mean and the standard deviation of the sample encoding feature, and $\sigma(y)$ and $\mu(y)$ respectively denote the mean and the standard deviation of the sample comprehensive feature. Adaptive instance normalization (AdaIN) is to adopt an AdaIN algorithm. AdaIN(x, y) denotes the sample fusion feature generated based on AdaIN.

As an example, in addition to the above AdaIN, an instance normalization (IN) algorithm may also be adopted, which is not limited.

Step 206: The computer device decodes the sample fusion feature to obtain a sample face-swapped image.

The computer device causes the sample fusion feature to pass through a decoder in the initialized face swapping model, and restores an image corresponding to the sample fusion feature through the decoder. The computer device takes the image outputted by the decoder as the sample face-swapped image. The decoder may restore an image corresponding to an injected feature based on the injected feature. The computer device decodes the sample fusion image through the decoder to obtain the sample face-swapped image. For example, the encoder may convolute an inputted image. Therefore, during operation, the decoder may perform a reverse operation according to an operation principle of the encoder, that is, a deconvolution operation, to restore the image corresponding to the sample fusion feature. For example, the encoder may be an AutoEncoder (AE), and the decoder may be a decoder corresponding to the AE.

The encoder includes a plurality of cascaded convolutional layers. The sample fusion feature is deconvoluted through the plurality of cascaded convolutional layers. Each convolutional layer inputs a deconvolution result to next convolutional layer to continue the deconvolution. The final convolutional layer outputs the sample face-swapped image.

Through step 205, feature migration is performed by normalization, so that the sample comprehensive feature can be migrated into an encoding feature of any image, to realize mixing of the sample comprehensive feature and the sample encoding feature. Moreover, the sample encoding feature is a feature representing various pixels in the second sample image, and the sample comprehensive feature integrates features of the first sample image and the second sample image from a global perspective. Therefore, by normalization, mixing between the encoding feature refined to the pixel level and the global comprehensive feature is realized, and feature distribution of the sample encoding feature is aligned with the sample comprehensive feature, so as to improve accuracy of the generated sample fusion feature. Through step 206, an image is decoded by using the sample fusion feature, so that the decoded image can be refined to various pixels to show the sample comprehensive feature, which improves a similarity between a face in the decoded image and the target face in terms of sense organs, and improves accuracy of face swapping.

Step 207: Determine a total loss of the initialized face swapping model based on a first difference between the sample face-swapped image and the sample attribute parameter, a second difference between a face feature of the sample face-swapped image and the face feature of the first sample image, and a third difference between the sample face-swapped image and the second sample image.

A first weight corresponding to the first difference, a second weight corresponding to the second difference, and a third weight corresponding to the third difference are acquired, and the first difference, the second difference, and the third difference are weighted and averaged based on the first weight, the second weight, and the third weight to obtain the total loss. The weights corresponding to the differences may be pre-configured weights.

Step 208: Train the initialized face swapping model based on the total loss until a target condition is met, and take a model obtained in response to the target condition being met as the face swapping model.

The computer device may determine a plurality of similarities between the sample face-swapped image and the sample attribute parameter, the face feature of the first sample image, as well as the second sample image respectively, and obtain the total loss based on the plurality of similarities. In some embodiments, the initialized face swapping model may include a discriminator. The computer device may determine authenticity of the sample face-swapped image by using the discriminator. A process in which the computer device determines the total loss may include the following steps: The computer device acquires a first similarity between an attribute parameter of the sample face-swapped image and the sample attribute parameter, and takes the first similarity as the first difference. The computer device acquires a second similarity between the face feature of the sample face-swapped image and the face feature of the first sample image, and takes the second similarity as the second difference. The computer device acquires, through the discriminator of the initialized face swapping model, a third similarity between the second sample image and the sample face-swapped image, and takes the third similarity as the first difference. The computer device determines the total loss based on the first similarity, the second similarity, and the third similarity.

The computer device may extract the attribute parameter of the sample face-swapped image, and determine the first similarity between the attribute parameter of the sample face-swapped image and the sample attribute parameter through the following formula (2).

$$3d \text{ feature loss}=\text{abs}(gt3d \text{ feature}-\text{result}3d \text{ feature}) \quad (2);$$

where 3d feature loss denotes the first similarity. The smaller the value of the first similarity is, the closer the attribute parameter of the sample face-swapped image is to the sample attribute parameter. result 3d feature denotes the attribute parameter of the sample face-swapped image, and gt 3d feature denotes the sample attribute parameter. abs denotes an absolute value of (gt 3d feature—result 3d feature). The sample attribute parameter may be the shape coefficient of the target face and the expression coefficient and the angle of the second sample image. Correspondingly, gt 3d feature may be expressed as the following formula (3):

$$gt3d \text{ feature}=\text{source}3d \text{ feature id}+\text{target}3d \text{ feature expression}+\text{target}3d \text{ feature angles}; \quad (3);$$

source 3d feature id denotes the shape coefficient of the first sample image, target 3d feature expression denotes the expression coefficient of the second sample image, and target 3d feature angles denote the angle of the second sample image.

The computer device may extract the face feature of the sample face-swapped image, and determine the second similarity between the face feature of the sample face-swapped image and the face feature of the first sample image through the following formula (4).

$$\text{id loss}=1-\text{cosine similarity}(\text{result id feature},\text{Mean Source ID}) \quad (4);$$

where id loss denotes the second similarity. The smaller the value of the second similarity is, the closer the face feature of the sample face-swapped image is to the face feature of the first sample image. result id feature denotes the face feature of the sample face-swapped image, and Mean Source ID denotes the face feature of the first sample image. cosine similarity (result id feature, Mean Source ID) denotes a cosine similarity between the result id feature and the Mean Source ID. The cosine similarity may be determined in a process as shown by the following formula (5):

$$\text{similarity} = \cos(\theta) = \frac{A \cdot B}{\|A\|\|B\|} = \frac{\sum_{i=1}^{n} A_i B_i}{\sqrt{\sum_{i=1}^{n}(A_i)^2}\sqrt{\sum_{i=1}^{n}(B_i)^2}}; \quad (5)$$

where A and B may respectively denote a feature vector corresponding to the face feature of the sample face-swapped image and a feature vector corresponding to the face feature of the first sample image. θ denotes an angle between the feature vector A and the feature vector B. $A_i$ denotes a component of an $i^{th}$ feature channel in the face feature of the sample face-swapped image. $B_i$ denotes a component of the $i^{th}$ feature channel in the face feature of the first sample image. similarity and cos(θ) denote the cosine similarity.

The computer device may input the second sample image as a real image into the discriminator, and input the sample face-swapped image into the discriminator. The computer device respectively acquires third scale images of the second sample image in at least one scale and fourth scale images of the sample face-swapped image in the at least one scale through the discriminator. The computer device acquires a discrimination probability corresponding to each of the third scale images, and acquires a discrimination probability corresponding to each of the fourth scale images. The discrimination probability of the image is used for indicating a probability of determining the image to be the real image. The image is the third scale image or the fourth scale image. The computer device determines the third similarity based on the discrimination probability corresponding to each of the third scale images and the discrimination probability corresponding to each of the fourth scale images. For example, the initialized face swapping model may include a generator and a discriminator. The computer device acquires a discrimination loss value corresponding to the discriminator, acquires a generation loss value corresponding to the generator, and determines the third similarity based on the generation loss value and the discrimination loss value. The generator is configured to generate the sample face-swapped image based on the second sample image and the first sample image. For example, the generator may include the encoder and the decoder used in step 204 to step 206. The third similarity may include the generation loss value and the discrimination loss value. The computer device may represent the generation loss value with the discrimination probability of the sample face-swapped image. For example, the computer device calculates the generation loss value based on the discrimination probability of the sample face-swapped image through the following formula (6).

$$G\ loss = \log(1 - D(result)) \tag{6};$$

where D(result) denotes the discrimination probability of the sample face-swapped image, the discrimination probability of the sample face-swapped image refers to a probability that the sample face-swapped image belongs to the real image, and G loss denotes the generation loss value.

The generator includes a plurality of cascaded convolutional layers. For example, the generator may have a U-Net structure. The second sample image and the first sample image are down-sampled through a U-Net. Then, a down-sampling result is up-sampled to obtain the sample face-swapped image. The discriminator also includes a plurality of cascaded convolutional layers. The discriminator has a down-sampling structure of the U-Net and a fully connected layer. The down-sampling structure of the U-Net convolutes the sample face-swapped image, and then the fully connected layer maps a convolution result to obtain the discrimination probability of the sample face-swapped image.

The discriminator may be a multi-scale discriminator. The computer device may scale the sample face-swapped image through the discriminator to obtain fourth scale images in multiple scales, for example, obtain a fourth scale image of the sample face-swapped image in a first scale, a fourth scale image in a second scale, and a fourth scale image in a third scale respectively. Similarly, the computer device may acquire a third scale image of the second sample image in the first scale, a third scale image in the second scale, and a third scale image in the third scale respectively through the discriminator. The first scale, the second scale, and the third scale may be set as required. For example, the first scale may be an original scale of the sample face-swapped image or the second sample image. The second scale may be ½ of the original scale. The third scale may be ¼ of the original scale. The computer device may acquire discrimination probabilities corresponding to scale images in various scales through the multi-scale discriminator, and calculate the discrimination loss value based on the discrimination probabilities of the scale images in multiple scales. For example, the computer device acquires the discrimination loss value based on the discrimination probability corresponding to each of the third scale images and the discrimination probability corresponding to each of the fourth scale images through the following formula (7).

$$D\ loss = \tfrac{1}{3} * \{ -\log D(template\ img) - \log(1 - D(result)) - \log D(template\ img\tfrac{1}{2}) - \log(1 - D(result\tfrac{1}{2})) - \log D(template\ img\tfrac{1}{4}) - \log(1 - D(result\tfrac{1}{4})) \} \tag{7};$$

where D(template img), D(template img½), and D(template img¼) respectively denote a discrimination probability of the third scale image of the second sample image in the original scale, a discrimination probability of the third scale image of the second sample image in the ½ scale, and a discrimination probability of the third scale image of the second sample image in the ¼ scale. D(result), D(result½), and D(result ¼) respectively denote a discrimination probability of the fourth scale image of the sample face-swapped image in the original scale, a discrimination probability of the fourth scale image of the sample face-swapped image in the ½ scale, and a discrimination probability of the fourth scale image of the sample face-swapped image in the ¼ scale. In this embodiment of this application, the second sample image may be taken as a real image.

The computer device may determine the third similarity based on the above discrimination loss value and generation loss value. For example, the third similarity=G loss+D loss. For the discriminator, when the generation loss value and the discrimination loss value reach a balance, it may be considered that the discriminator has reached a training stop condition, and no further training is needed.

The computer device may determine the total loss based on the first similarity, the second similarity, and the third similarity through the following formula (8):

$$loss = id\ loss + 3d\ feature\ loss + D\ loss + G\ loss \tag{8};$$

where loss denotes the total loss, 3d feature loss denotes the first similarity, id loss denotes the second similarity, and (D loss+G loss) denotes the third similarity.

The computer device may iteratively train the initialized face swapping model based on step 201 to step 206, acquire a total loss corresponding to each iterative training, and adjust a parameter of the initialized face swapping model based on the total loss of each iterative training. For example, parameters included in the encoder, the decoder, and the discriminator in the initialized face swapping model are optimized multiple times until the total loss meets a target condition, and the computer device stops training and takes a model obtained from final optimization as the face swapping model. The target condition may be a value of the total loss being within a target numerical range. The target numerical range is a range preset according to a plurality of experiments. For example, the total loss is within the target numerical range of 0.5 or less. Alternatively, the time consumed by multiple iterative trainings exceeds a maximum time length. The maximum time length is 70% of a required time length from training to application release. For example, the required time length from training to application release is 1 hour. If the time consumed by multiple iterative trainings exceeds 0.7 hour, it indicates that the target condition is met.

Figure 3:
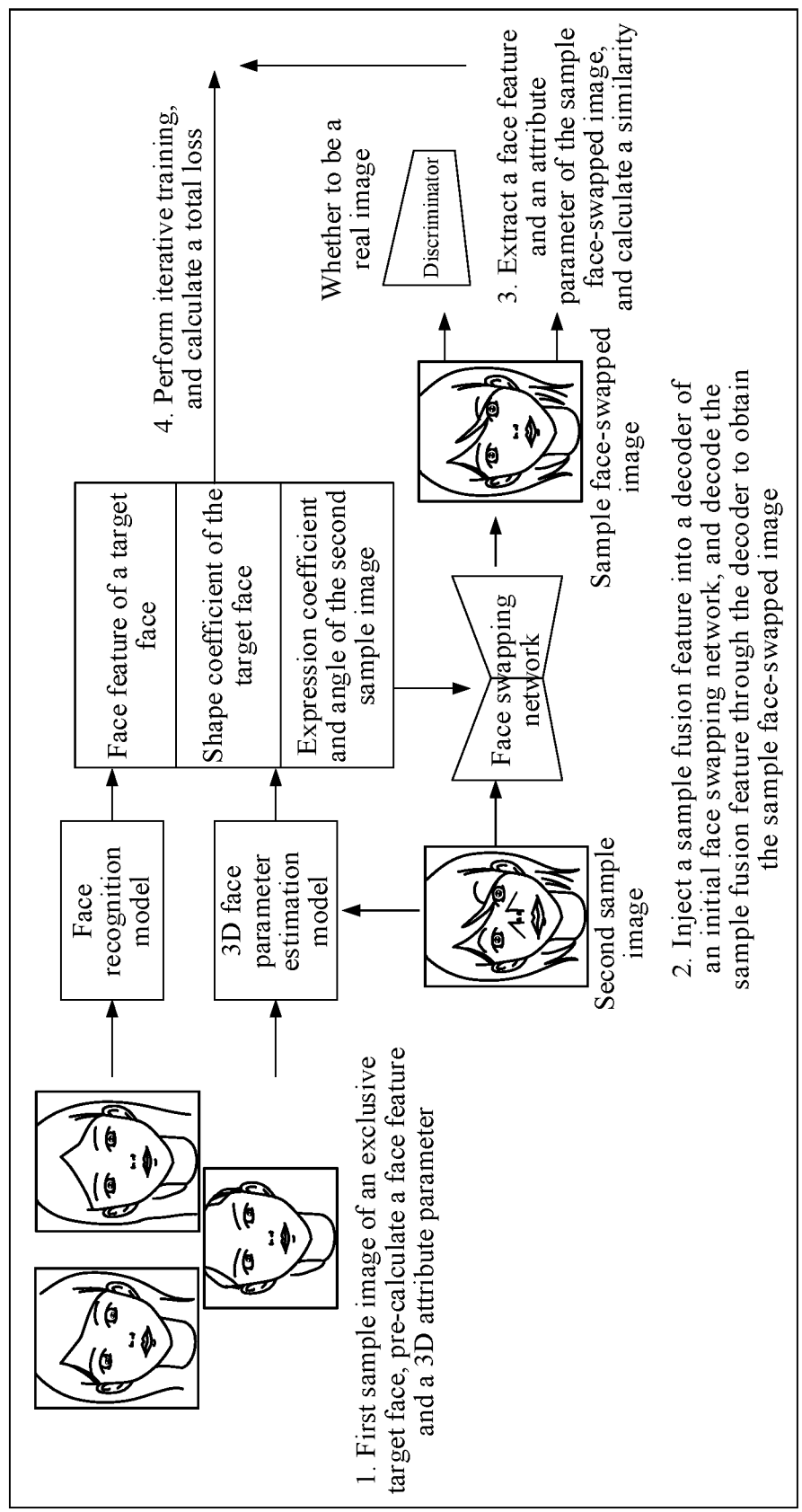
FIG. 3 is a schematic diagram of a framework of a training process of a face swapping model according to an embodiment of this application.

FIG. 3 is a schematic diagram of a framework of a training process of a face swapping model according to an embodiment of this application. As shown in FIG. 3, the computer device may take a face of an object A as an exclusive target face, acquire face images of a plurality of poses of the face of the object A as a first sample image, extract an attribute parameter of the first sample image through a 3D face parameter estimation model, extract a face feature of the first sample image through a face recognition model, and extract an attribute parameter of a second sample image through the 3D face parameter estimation model. The computer device integrates the face feature and a shape coefficient of the first sample image and a pre-configuration parameter (such as an expression coefficient and an angle coefficient) of the second sample image into a sample attribute parameter. The computer device may input the second sample image into an initialized face swapping model. The initialized face swapping model may include an encoder and a decoder. The computer device may encode the second sample image through the encoder to obtain an encoding feature of the second sample image. For example, the second sample image is encoded as a corresponding feature vector. The computer device obtains a sample fusion feature based on the sample attribute parameter and the encoding feature of the second sample image, and injects the sample fusion feature into the decoder in the initialized face swapping model. The decoder may restore an image corresponding to the injected feature based on the injected feature. The computer device decodes the sample fusion image through the decoder to obtain a sample face-swapped image. For example, the decoder may perform a deconvolution operation according to an operation principle of the encoder to restore an image corresponding to the sample fusion feature.

The computer device acquires a third similarity through a multi-scale discriminator, acquires a first similarity and a second similarity based on an extracted face feature and an extracted attribute parameter of the sample face-swapped image, and calculates a total loss based on the first similarity, the second similarity, and the third similarity to optimize a model parameter according to the total loss. The computer device performs iterative training through the above process and stops the training until a target condition is met, to obtain a face swapping model that can replace a face in any image with the exclusive target face.

Figure 4:
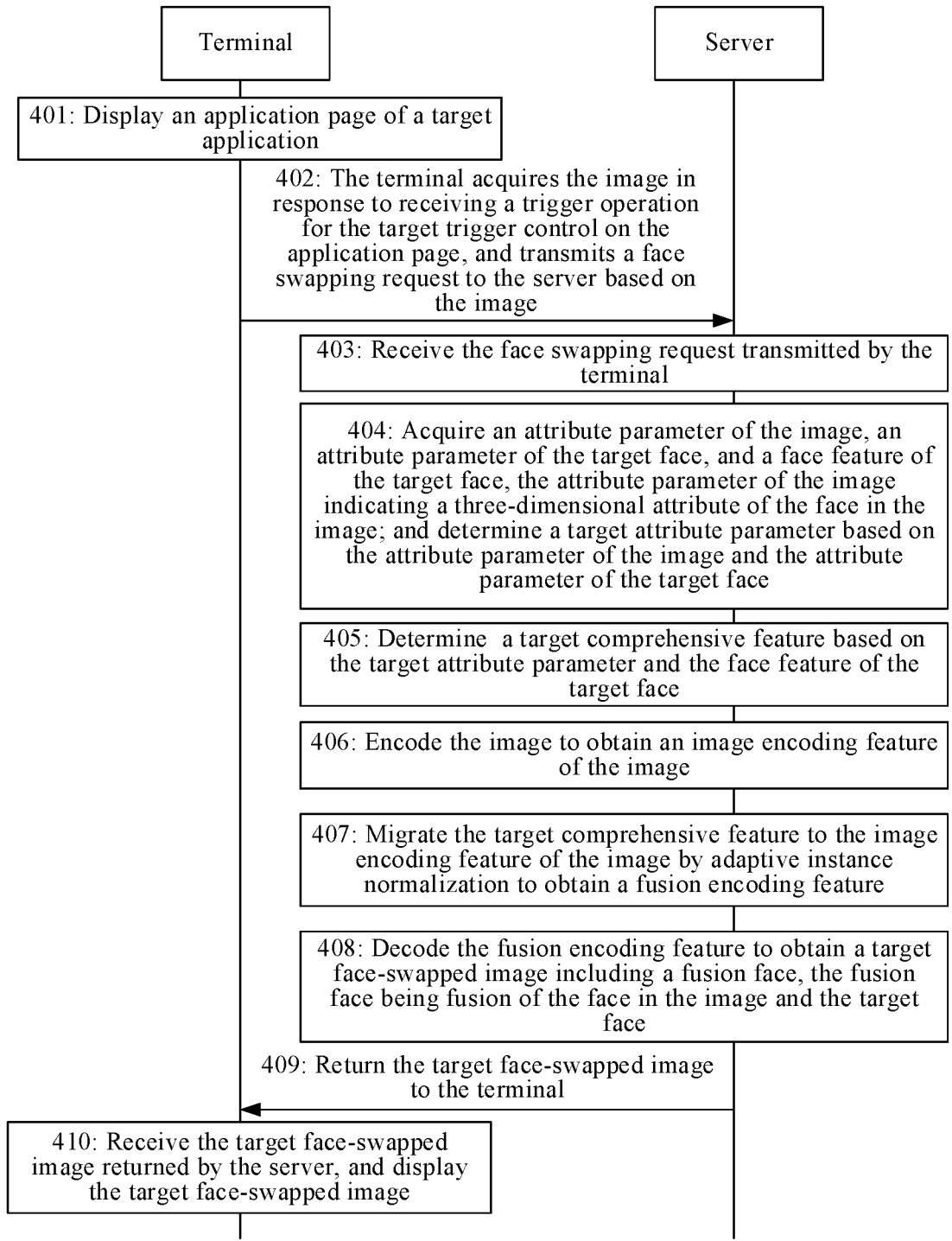
FIG. 4 is a signaling interaction diagram of an image processing method according to an embodiment of this application.

FIG. 4 is a signaling interaction diagram of an image processing method according to an embodiment of this application. As shown in FIG. 4, the image processing method may be realized through interaction between a server and a terminal. An interaction process of the image processing method may be obtained with reference to step 401 to step 410.

Step 401: The terminal displays an application page of a target application, the application page including a target trigger control, the target trigger control being configured to trigger a face swapping request for an image.

The target application may provide a face swapping function. The face swapping function may be a function of swapping a face in the image for an exclusive target face. The target trigger control may be provided on the application page of the target application. The terminal may transmit a face swapping request to the server based on a trigger operation of an object on the target trigger control. For example, the target application may be an image processing application, a live streaming application, a photo tool, a video editing application, or the like. The server may be a back-end server for the target application, or the server may be any computer device used for providing a face swapping function, such as a cloud computing center device provided with a face swapping model.

Step 402: The terminal acquires the image in response to receiving a trigger operation for the target trigger control on the application page, and transmits a face swapping request to the server based on the image.

In some embodiments, the target application may provide a face swapping function for a single image. For example, the target application may be an image processing application, a live streaming application, a social application, or the like. The image may be a selected image acquired by the terminal from a local storage space, or an image acquired by the terminal and obtained by shooting an object in real time. In some embodiments, the target application may provide a function of swapping a face of each image frame included in a video. For example, the target application may be a video editing application, a live streaming application, or the like. The server may wholly replace image frames including the face of the object A with the target face. The image may include each image frame in the video, or the terminal may perform initial face detection on each image frame in the video, and take each image frame including the face of the object A in the video as the image.

Step 403: The server receives the face swapping request transmitted by the terminal.

Step 404: The server acquires an attribute parameter of the image, an attribute parameter of the target face, and a face feature of the target face, the attribute parameter of the image indicating a three-dimensional attribute of the face in the image; and determines a target attribute parameter based on the attribute parameter of the image and the attribute parameter of the target face.

The face swapping request is used for requesting replacement of the face in the image with the target face. The attribute parameter of the image is used for indicating a three-dimensional attribute of the face in the image. The server may acquire the attribute parameter of the image through a 3D face parameter estimation model. The attribute parameter of the image includes at least one of a shape coefficient, an expression coefficient, an angle coefficient, a texture coefficient, and an illumination coefficient. The attribute parameter of the target face and the face feature of the target face may be pre-stored.

In some embodiments, the server may determine the shape coefficient of the target face and a pre-configuration parameter of the image to be the target attribute parameter. The pre-configuration parameter includes at least one of an expression coefficient, an angle coefficient, a texture coefficient, and an illumination coefficient. For example, the pre-configuration parameter may include the expression coefficient and the angle coefficient. Alternatively, the pre-configuration parameter may include the texture coefficient, the illumination coefficient, and the like.

Step 405: The server determines a target comprehensive feature based on the target attribute parameter and the face feature of the target face.

The server may splice the target attribute parameter and the face feature of the target face to obtain the target comprehensive feature.

It should be noted that the server may be provided with a trained face swapping model. The server may perform a process from step 404 to step 405 through the face swapping model. The face swapping model is obtained by training based on step 201 to step 208. The server may fixedly store the face feature and the attribute parameter of the target face, for example, to a target address in the training of the face swapping model. When performing step 404 and step 405, the server may extract the attribute parameter of the target face from the target address and perform step 404, and the server extracts the face feature of the target face from the target address and perform step 405. The server may perform a process from step 406 to step 408 through the face swapping model.

Step 406: The server encodes the image to obtain an image encoding feature of the image.

Step 407: Migrate the target comprehensive feature to the image encoding feature of the image by normalization to obtain a fusion encoding feature.

In a possible implementation, the computer device may align a mean and a standard deviation of the image encoding feature with the target comprehensive feature. Step 407 may be implemented through the following technical solution: The server acquires a first mean and a first standard deviation of the image encoding feature in at least one feature channel to take normal distribution conforming to the first mean and the first standard deviation as first feature distribution, and acquires a second mean and a second standard deviation of the target comprehensive feature in the at least one feature channel to take normal distribution conforming to the second mean and the second standard deviation as second feature distribution. The server aligns the image encoding feature from the first feature distribution to the second feature distribution to obtain the fusion encoding feature. Specifically, the server maps the image encoding feature to cause the mean and the standard deviation of the image encoding feature in each feature channel to be aligned with the mean and the standard deviation of the target comprehensive feature in the corresponding feature channel, so as to obtain the fusion encoding feature. For example, the server may also calculate the fusion encoding feature by using the formula (1) in step 205.

Step 408: The server decodes the fusion encoding feature to obtain a target face-swapped image including a fusion face, the fusion face being fusion of the face in the image and the target face.

An implementation manner in which the server performs step 403 to step 408 to obtain the target face-swapped image is similar to the implementation manner in which the computer device performs step 201 to step 206 to obtain the sample face-swapped image. Details are not described herein again.

Step 409: The server returns the target face-swapped image to the terminal.

When the image is a single image, the server may return a target face-swapped image corresponding to the single image to the terminal. When the image is a plurality of image frames included in a video, the server may generate, for each image frame in the video, a target face-swapped image corresponding to the image frame through step 403 to step 408. The server may return a face-swapped video corresponding to the video to the terminal. The face-swapped video includes the target face-swapped image corresponding to each image frame.

Step 410: The terminal receives the target face-swapped image returned by the server, and displays the target face-swapped image.

The terminal may display the target face-swapped image on the application page. Alternatively, the terminal may play each target face-swapped image in the face-swapped video on the application page.

In the image processing method according to this embodiment of this application, the attribute parameter of the image is acquired, the attribute parameter being used for indicating a three-dimensional attribute feature of a face in an image, and the target attribute parameter is determined based on the attribute parameter of the image and the attribute parameter of the target face, so as to position a three-dimensional attribute feature of a face in an image expected to be generated. Moreover, the target comprehensive feature that can comprehensively represent the image and the target face is obtained based on the target attribute parameter and the face feature of the target face. The image is encoded to obtain the image encoding feature of the image, so as to obtain a pixel-level refined feature of the image through the image encoding feature. Further, the target comprehensive feature is migrated to the image encoding feature of the image by normalization to obtain a fusion encoding feature. In this application, the encoding feature refined to the pixel level and the global comprehensive feature are mixed, and feature distribution of the image encoding feature is aligned with the target comprehensive feature, so as to improve accuracy of the generated fusion encoding feature. The fusion encoding feature is decoded to obtain the target face-swapped image including the fusion face, and a decoded image can be refined to each pixel to show the target comprehensive feature, so that sense organs of a fusion face in the decoded image are closer to the target face, which improves a similarity between the fusion face and the target face in terms of sense organs, thereby improving accuracy of face swapping.

Figure 5:
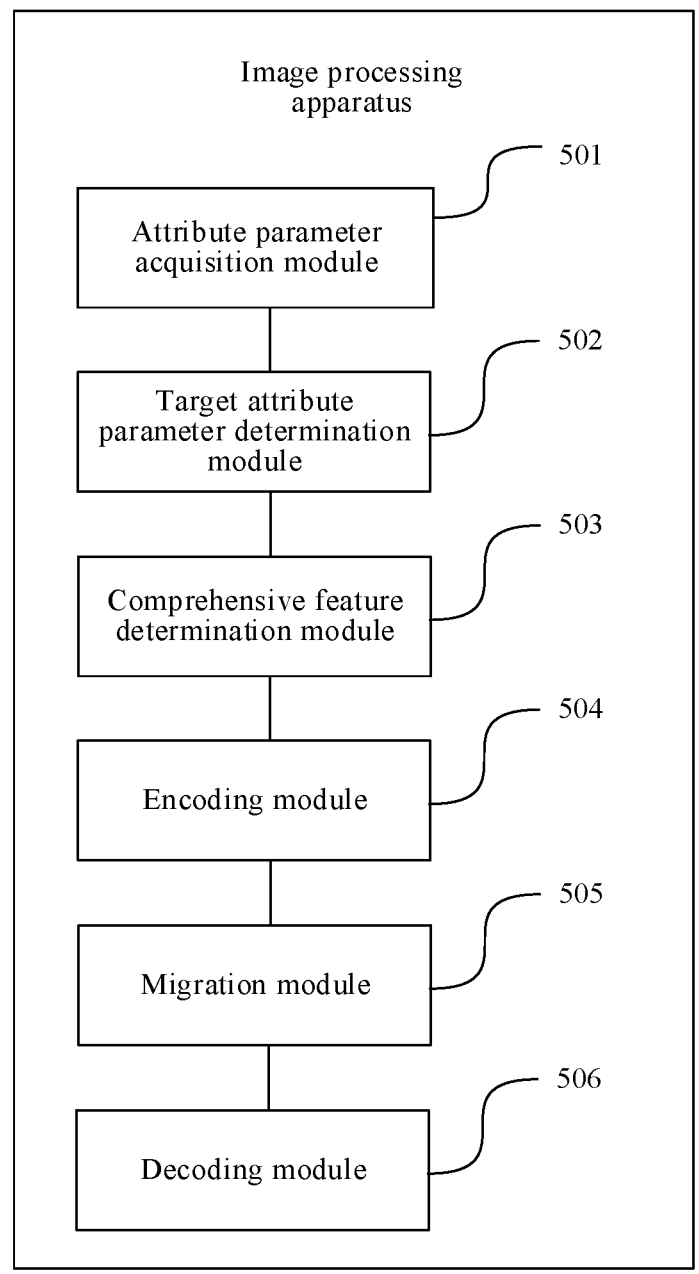
FIG. 5 is a schematic structural diagram of an image processing apparatus according to an embodiment of this application.

FIG. 5 is a schematic structural diagram of an image processing apparatus according to an embodiment of this application. As shown in FIG. 5, the apparatus includes: an attribute parameter acquisition module 501 configured to receive a face swapping request, the face swapping request being used for requesting replacement of a face in an image with a target face; a target attribute parameter determination module 502 configured to acquire an attribute parameter of the image, an attribute parameter of the target face, and a face feature of the target face, the attribute parameter of the image indicating a three-dimensional attribute of the face in the image; and determine a target attribute parameter based on the attribute parameter of the image and the attribute parameter of the target face; a comprehensive feature determination module 503 configured to determine a target comprehensive feature based on the target attribute parameter and the face feature of the target face; an encoding module 504 configured to encode the image to obtain an image encoding feature of the image; a migration module 505 configured to migrate the target comprehensive feature to the image encoding feature of the image by normalization to obtain a fusion encoding feature; and a decoding module 506 configured to decode the fusion encoding feature to obtain a target face-swapped image including a fusion face, the fusion face being fusion of the face in the image and the target face.

In some embodiments, the attribute parameter of the target face is a shape coefficient, and the attribute parameter of the image is a pre-configuration parameter. The target attribute parameter determination module is configured to determine the shape coefficient of the target face and the pre-configuration parameter of the image to be the target attribute parameter. The pre-configuration parameter includes at least one of an expression coefficient, an angle coefficient, a texture coefficient, and an illumination coefficient.

In some embodiments, the migration module is configured to: acquire a first mean and a first standard deviation of the image encoding feature in at least one feature channel to take normal distribution conforming to the first mean and the first standard deviation as first feature distribution, and acquire a second mean and a second standard deviation of the target comprehensive feature in the at least one feature channel to take normal distribution conforming to the second mean and the second standard deviation as second feature distribution; and align the image encoding feature from the first feature distribution to the second feature distribution to obtain the fusion encoding feature.

In some embodiments, the target face-swapped image is obtained by invoking a trained face swapping model. The face swapping model is configured to swap the target face to any face image based on the attribute parameter and the face feature of the target face. The apparatus further includes a model training module. The model training module includes: an acquisition unit configured to acquire a face feature and an attribute parameter of a first sample image, and acquire an attribute parameter of a second sample image, the first sample image including the target face, the second sample image including a to-be-replaced face; a sample attribute parameter determination unit configured to determine a sample attribute parameter based on the attribute parameter of the first sample image and the attribute parameter of the second sample image, the sample attribute parameter being used for indicating an expected attribute of a face in a to-be-generated sample face-swapped image; and a sample comprehensive feature acquisition unit configured to determine a sample comprehensive feature based on the sample attribute parameter and the face feature of the first sample image; an encoding unit configured to encode the second sample image to obtain a sample encoding feature; a migration unit configured to migrate the sample comprehensive feature to the sample encoding feature of the second sample image to obtain a sample fusion feature; a decoding unit configured to decode the sample fusion feature to obtain a sample face-swapped image; and a training unit configured to determine a total loss of the initialized face swapping model based on a first difference between the sample face-swapped image and the sample attribute parameter, a second difference between a face feature of the sample face-swapped image and the face feature of the first sample image, and a third difference between the sample face-swapped image and the second sample image; and train the initialized face swapping model based on the total loss until a target condition is met, and take a model obtained in response to the target condition being met as the face swapping model.

In some embodiments, the training unit is further configured to: acquire a first similarity between an attribute parameter of the sample face-swapped image and the sample attribute parameter, and take the first similarity as the first difference; acquire a second similarity between the face feature of the sample face-swapped image and the face feature of the first sample image, and take the second similarity as the second difference; and acquire a third similarity between the second sample image and the sample face-swapped image, and take the third similarity as the third difference.

In some embodiments, the training unit is further configured to: acquire first scale images of the second sample image in at least one scale and second scale images of the sample face-swapped image in the at least one scale; take the second sample image as a real image; acquire a discrimination probability corresponding to each of the first scale images, and acquire a discrimination probability corresponding to each of the second scale images, the discrimination probability of the image being used for indicating a probability of determining the image to be the real image, the image being the first scale image or the second scale image; and determine the third similarity based on the discrimination probability corresponding to each of the first scale images and the discrimination probability corresponding to each of the second scale images.

In some embodiments, the acquisition unit is further configured to: acquire at least two pose images, and take the at least two pose images as the first sample image, the at least two pose images including at least two face poses of the target face; acquire face features and attribute parameters corresponding to the at least two face poses based on the at least two pose images; and take a mean of the face features corresponding to the at least two face poses as the face feature of the first sample image, and take a mean of the attribute parameters corresponding to the at least two face poses as the attribute parameter of the first sample image.

Correspondingly, the apparatus further includes a storage unit. The storage unit is configured to store the face feature and the attribute parameter of the first sample image.

In some embodiments, the acquisition unit is further configured to: perform face recognition on at least two image frames included in a video of a target object to obtain at least two image frames including the target face, the target face being a face of the target object; and perform face cropping on the at least two image frames to obtain the at least two pose images.

In the image processing apparatus according to this embodiment of this application, the attribute parameter of the image is acquired, the attribute parameter being used for indicating a three-dimensional attribute feature of a face in an image, and the target attribute parameter is determined based on the attribute parameter of the image and the attribute parameter of the target face, so as to position a three-dimensional attribute feature of a face in an image expected to be generated. Moreover, the target comprehensive feature that can comprehensively represent the image and the target face is obtained based on the target attribute parameter and the face feature of the target face. The image is encoded to obtain the image encoding feature of the image, so as to obtain a pixel-level refined feature of the image through the image encoding feature. Further, the target comprehensive feature is migrated to the image encoding feature of the image by normalization to obtain a fusion encoding feature. In this application, the encoding feature refined to the pixel level and the global comprehensive feature are mixed, and feature distribution of the image encoding feature is aligned with the target comprehensive feature, thereby improving accuracy of the generated fusion encoding feature. The fusion encoding feature is decoded to obtain the target face-swapped image including the fusion face, and a decoded image can be refined to each pixel to show the target comprehensive feature, so that sense organs of a fusion face in the decoded image are closer to the target face, which improves a similarity between the fusion face and the target face in terms of sense organs, thereby improving accuracy of face swapping.

The apparatuses in the embodiments of this application may perform the image processing methods according to the embodiments of this application, which are similar in implementation principle. The operations performed by the modules in the apparatuses in the embodiments of this application correspond to the steps in the image processing methods according to the embodiments of this application. Detailed function descriptions of the modules of the apparatuses may be specifically obtained with reference to the descriptions in the corresponding image processing methods hereinabove. Details are not described herein again.

Figure 6:
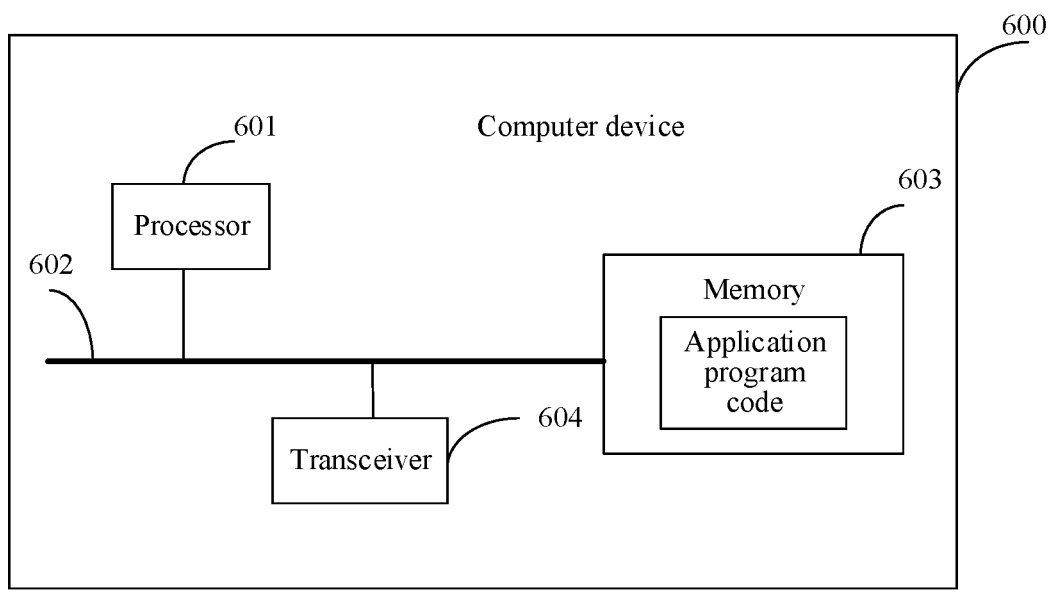
FIG. 6 is a schematic structural diagram of a computer device according to an embodiment of this application.

FIG. 6 is a schematic structural diagram of a computer device according to an embodiment of this application. As shown in FIG. 6, the computer device includes: a memory, a processor, and a computer program stored in the memory, the processor executing the above computer program to implement the steps of the image processing method.

In the image processing apparatus according to this embodiment of this application, the attribute parameter of the image is acquired, the attribute parameter being used for indicating a three-dimensional attribute feature of a face in an image, and the target attribute parameter is determined based on the attribute parameter of the image and the attribute parameter of the target face, so as to position a three-dimensional attribute feature of a face in an image expected to be generated. Moreover, the target comprehensive feature that can comprehensively represent the image and the target face is obtained based on the target attribute parameter and the face feature of the target face. The image is encoded to obtain the image encoding feature of the image, so as to obtain a pixel-level refined feature of the image through the image encoding feature. Further, the target comprehensive feature is migrated to the image encoding feature of the image by normalization to obtain a fusion encoding feature. In this application, the encoding feature refined to the pixel level and the global comprehensive feature are mixed, and feature distribution of the image encoding feature is aligned with the target comprehensive feature, so as to improve accuracy of the generated fusion encoding feature. The fusion encoding feature is decoded to obtain the target face-swapped image including the fusion face, and a decoded image can be refined to each pixel to show the target comprehensive feature, so that sense organs of a fusion face in the decoded image are closer to the target face, which improves a similarity between the fusion face and the target face in terms of sense organs, thereby improving accuracy of face swapping.

In an exemplary embodiment, a computer device is provided. As shown in FIG. 6, a computer device 600 shown in FIG. 6 includes: a processor 601 and a memory 603. The processor 601 and the memory 603 are connected, for example, are connected by a bus 602. In some embodiments, the computer device 600 may further include a transceiver 604. The transceiver 604 may be configured for data exchange between the computer device and another computer device, such as data transmission and/or data receiving. It should be noted that during actual application, there may be one or more transceivers 604. The structure of the computer device 600 does not constitute a limitation on this embodiment of this application.

The processor 601 may be a central processing unit (CPU), a general-purpose processor, a data signal processor (DSP), an application specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in this application. The processor 601 may also be a combination that implements computing functions, for example, including a combination of one or more microprocessors or a combination of a DSP and a microprocessor.

The bus 602 may include a channel, to transmit information between the foregoing components. The bus 602 may be a peripheral component interconnect (PCI) bus, an extended industry standard architecture (EISA) bus, or the like. The bus 602 may be classified into an address bus, a data bus, a control bus, and the like. For ease of description, the bus in FIG. 6 is represented by using only one bold line, but this does not indicate that there is only one bus or one type of bus.

The memory 603 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital universal optical disc, a blue-ray optical disc, and the like), a magnetic disk storage medium\another magnetic storage device, or any other medium capable of carrying or storing a computer program and being read by a computer, but is not limited thereto.

The memory 603 is configured to store the computer program for performing the embodiment of this application, and is executed under control of the processor 601. The processor 601 is configured to execute the computer program stored in the memory 603 to implement the step shown in the foregoing method embodiments.

The computer device includes, but is not limited to, a server, a cloud computing center device, and the like.

An embodiment of this application provides a computer-readable storage medium, storing a computer program, the computer program, when executed by a processor, implementing the steps and corresponding contents shown in the foregoing method embodiments.

An embodiment of this application provides a computer program product, including a computer program, the computer program, when executed by a processor, implementing the steps and corresponding contents shown in the foregoing method embodiments.

A person skilled in the art may understand that, the singular forms "a", "an", "said", and "the" used herein may include the plural forms as well, unless the context clearly indicates otherwise. The terms "comprise" and "include" used in the embodiments of this application mean that the corresponding features may be realized as presented features, information, data, steps, and operations, without excluding other features, information, data, steps, and operations supported by the technical field.

The terms such as "first", "second", "third", "fourth", "1" and "2" (if any) in the specification and claims of this application and in the accompanying drawings are used for distinguishing similar objects and not necessarily used for describing any particular order or sequence. It is understood that such used data is interchangeable in proper circumstances, so that the embodiments of this application described herein can be implemented in a sequence other than those illustrated or described in words.

It is to be understood that, although the operation steps are indicated by arrows in the flowcharts of the embodiments of this application, the steps are not necessarily performed in the sequence indicated by the arrows. Unless specifically stated herein, the implementation steps in each flowchart may be performed in other sequences as required in some implementation scenarios of the embodiments of this application. In addition, some or all of the steps in each flowchart are based on an actual implementation scenario and may include a plurality of sub-steps or phases. Some or all of the sub-steps or phases may be performed at the same time. Each of the sub-steps or phases may also be performed at a different time. In a scenario of different execution times, the execution sequence of the sub-steps or phases can be flexibly configured as required, which is not limited in the embodiments of this application.

The foregoing descriptions are merely exemplary implementations of some implementation scenarios of this application. A person of ordinary skill in the art may adopt other similar implementation means based on the technical ideas of this application without departing from the technical concept of the solution of this application, which also fall within the protection scope of the embodiments of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An image processing method performed by a computer device, the method comprising:
   receiving a face swapping request, the face swapping request being used for requesting replacement of a face in an image with a target face;
   acquiring an attribute parameter of the image, an attribute parameter of the target face, and a face feature of the target face, the attribute parameter of the image indicating a three-dimensional attribute of the face in the image and the face feature of the target face indicating a feature of the face in the image in a two-dimensional plane;
   determining a target attribute parameter based on the attribute parameter of the image and the attribute parameter of the target face;
   determining a target comprehensive feature based on the target attribute parameter and the face feature of the target face;
   encoding the image to obtain an image encoding feature vector of the image;
   migrating the target comprehensive feature to the image encoding feature vector of the image by (i) normalization of the target comprehensive feature and the image encoding feature vector of the image, respectively, and (ii) alignment of the normalized target comprehensive feature and the normalized image encoding feature vector of the image, to obtain a fusion encoding feature vector; and
   decoding the fusion encoding feature vector to obtain the fusion face.

2. The image processing method according to claim 1, wherein the normalization of the target comprehensive feature and the image encoding feature vector of the image comprises:
   acquiring a first mean and a first standard deviation of the image encoding feature in at least one feature channel to take normal distribution conforming to the first mean and the first standard deviation as first feature distribution, and acquiring a second mean and a second standard deviation of the target comprehensive feature in the at least one feature channel to take normal distribution conforming to the second mean and the second standard deviation as second feature distribution; and
   the alignment of the normalized target comprehensive feature and the normalized image encoding feature vector of the image comprises:
   aligning the image encoding feature from the first feature distribution to the second feature distribution to obtain the fusion encoding feature.

3. The image processing method according to claim 1, wherein the attribute parameter of the target face is a shape coefficient, and the attribute parameter of the image is a pre-configuration parameter; and
   the determining a target attribute parameter based on the attribute parameter of the image and the attribute parameter of the target face comprises:
   determining the shape coefficient of the target face and the pre-configuration parameter of the image to be the target attribute parameter, the pre-configuration parameter comprising at least one of an expression coefficient, an angle coefficient, a texture coefficient, and an illumination coefficient.

4. The image processing method according to claim 1, wherein the target face-swapped image is obtained by invoking a face swapping model; the face swapping model being configured to swap the target face to a face image based on the attribute parameter and the face feature of the target face.

5. A computer device, comprising a memory, a processor, and a computer program stored on the memory, the computer program, when executed by the processor, causing the computer device to implement an image processing method including:
   receiving a face swapping request, the face swapping request being used for requesting replacement of a face in an image with a target face;
   acquiring an attribute parameter of the image, an attribute parameter of the target face, and a face feature of the target face, the attribute parameter of the image indicating a three-dimensional attribute of the face in the image and the face feature of the target face indicating a feature of the face in the image in a two-dimensional plane;
   determining a target attribute parameter based on the attribute parameter of the image and the attribute parameter of the target face;
   determining a target comprehensive feature based on the target attribute parameter and the face feature of the target face;
   encoding the image to obtain an image encoding feature vector of the image;
   migrating the target comprehensive feature to the image encoding feature vector of the image by (i) normalization of the target comprehensive feature and the image encoding feature vector of the image, respectively, and (ii) alignment of the normalized target comprehensive feature and the normalized image encoding feature vector of the image, to obtain a fusion encoding feature vector; and
   decoding the fusion encoding feature vector to obtain the fusion face.

6. The computer device according to claim 5, wherein the normalization of the target comprehensive feature and the image encoding feature vector of the image comprises:
   acquiring a first mean and a first standard deviation of the image encoding feature in at least one feature channel to take normal distribution conforming to the first mean and the first standard deviation as first feature distribution, and acquiring a second mean and a second standard deviation of the target comprehensive feature in the at least one feature channel to take normal distribution conforming to the second mean and the second standard deviation as second feature distribution; and
   the alignment of the normalized target comprehensive feature and the normalized image encoding feature vector of the image comprises:
   aligning the image encoding feature from the first feature distribution to the second feature distribution to obtain the fusion encoding feature.

7. The computer device according to claim 5, wherein the attribute parameter of the target face is a shape coefficient, and the attribute parameter of the image is a pre-configuration parameter; and
   the determining a target attribute parameter based on the attribute parameter of the image and the attribute parameter of the target face comprises:
   determining the shape coefficient of the target face and the pre-configuration parameter of the image to be the target attribute parameter, the pre-configuration parameter comprising at least one of an expression coefficient, an angle coefficient, a texture coefficient, and an illumination coefficient.

8. The computer device according to claim 6, wherein the target face-swapped image is obtained by invoking a trained face swapping model; the face swapping model being configured to swap the target face to a face image based on the attribute parameter and the face feature of the target face.

9. A non-transitory computer-readable storage medium, storing a computer program, the computer program, when executed by a processor of a computer device, causing the computer device to implement an image processing method including:
- receiving a face swapping request, the face swapping request being used for requesting replacement of a face in an image with a target face;
- acquiring an attribute parameter of the image, an attribute parameter of the target face, and a face feature of the target face, the attribute parameter of the image indicating a three-dimensional attribute of the face in the image and the face feature of the target face indicating a feature of the face in the image in a two-dimensional plane;
- determining a target attribute parameter based on the attribute parameter of the image and the attribute parameter of the target face;
- determining a target comprehensive feature based on the target attribute parameter and the face feature of the target face;
- encoding the image to obtain an image encoding feature vector of the image;
- migrating the target comprehensive feature to the image encoding feature vector of the image by (i) normalization of the target comprehensive feature and the image encoding feature vector of the image, respectively, and (ii) alignment of the normalized target comprehensive feature and the normalized image encoding feature vector of the image, to obtain a fusion encoding feature vector; and
- decoding the fusion encoding feature vector to obtain the fusion face.

10. The non-transitory computer-readable storage medium according to claim 9, wherein the normalization of the target comprehensive feature and the image encoding feature vector of the image comprises:
- acquiring a first mean and a first standard deviation of the image encoding feature in at least one feature channel to take normal distribution conforming to the first mean and the first standard deviation as first feature distribution, and acquiring a second mean and a second standard deviation of the target comprehensive feature in the at least one feature channel to take normal distribution conforming to the second mean and the second standard deviation as second feature distribution; and the alignment of the normalized target comprehensive feature and the normalized image encoding feature vector of the image comprises:
- aligning the image encoding feature from the first feature distribution to the second feature distribution to obtain the fusion encoding feature.

11. The non-transitory computer-readable storage medium according to claim 9, wherein the attribute parameter of the target face is a shape coefficient, and the attribute parameter of the image is a pre-configuration parameter; and
the determining a target attribute parameter based on the attribute parameter of the image and the attribute parameter of the target face comprises:
- determining the shape coefficient of the target face and the pre-configuration parameter of the image to be the target attribute parameter, the pre-configuration parameter comprising at least one of an expression coefficient, an angle coefficient, a texture coefficient, and an illumination coefficient.

12. The non-transitory computer-readable storage medium according to claim 9, wherein the target face-swapped image is obtained by invoking a trained face swapping model; the face swapping model being configured to swap the target face to a face image based on the attribute parameter and the face feature of the target face.

* * * * *